United States Patent [19]

Shimura

[11] Patent Number: 5,101,570
[45] Date of Patent: Apr. 7, 1992

[54] INCLINATION ANGLE DETECTOR

[75] Inventor: Kikuo Shimura, Minamiashigara, Japan

[73] Assignee: Kabushiki Kaisha Sokkisha, Tokyo, Japan

[21] Appl. No.: 474,756
[22] PCT Filed: Jul. 14, 1989
[86] PCT No.: PCT/JP89/00712
 § 371 Date: Mar. 26, 1990
 § 102(e) Date: Mar. 26, 1990
[87] PCT Pub. No.: WO90/01677
 PCT Pub. Date: Feb. 22, 1990

[30] Foreign Application Priority Data

Aug. 2, 1988 [JP] Japan .................. 63-192034
Aug. 2, 1988 [JP] Japan .................. 63-192035

[51] Int. Cl.⁵ ............................................. G01C 9/24
[52] U.S. Cl. ........................................ 33/366; 33/379
[58] Field of Search .................. 33/366, 365, 377, 379,
 33/389, 390, DIG. 3; 356/138, 249; 250/231.1,
 231.16, 577

[56] References Cited

U.S. PATENT DOCUMENTS

| | | | |
|---|---|---|---|
| 4,307,516 | 12/1981 | Walker | 33/366 |
| 4,628,612 | 12/1986 | Hori et al. | 33/366 |
| 4,666,299 | 5/1987 | Tamaki et al. | 33/366 |
| 4,676,103 | 6/1987 | Nakajima | 33/377 X |
| 4,841,136 | 6/1989 | Nakayama et al. | 33/366 X |
| 4,861,981 | 8/1989 | Winiger | 33/366 X |
| 4,869,590 | 9/1989 | Feist et al. | 356/249 X |

FOREIGN PATENT DOCUMENTS 60-252215 12/1985 Japan .
61-40505 2/1986 Japan .
504-086 3/1976 U.S.S.R. .

OTHER PUBLICATIONS

G2298A/32 SU-485-308, Building Prod. Res. 26.01.73-SU-875652 (21.01.76)G01c-09/36.

Primary Examiner—William A. Cuchlinski, Jr.
Assistant Examiner—C. W. Fulton
Attorney, Agent, or Firm—Armstrong, Nikaido, Marmelstein, Kubovcik & Murray

[57] ABSTRACT

An inclination angle detector electrically detects an angle of inclination of an object of measurement with respect to the horizontal direction or the direction of gravitation. An inclination angle detector includes a bubble tube having a transparent container formed such that the inner surface of an upper part thereof has a spherical concave surface. The transparent container has a gas and a transparent liquid sealed therein. A light-emitting unit emits light towards the bubble tube from the upper or lower side thereof. A light-receiving element converts the light transmitted by the bubble tube into an electric signal. An operating unit calculates an angle of inclination based on the electric signal. The light-receiving element includes a light-receiving unit for position detection within a movable range of a bubble shadow and a light-receiving unit for reference outside the movable range. The light-receiving unit for position detection further includes a pair of rectangular light-receiving pieces disposed such that their respective longitudinal center lines extending along the direction of inclination detection coincide with each other. The widths of the rectangular light-receiving pieces are equal to each other and smaller than the diameter of the bubble shadow.

2 Claims, 3 Drawing Sheets

1

INCLINATION ANGLE DETECTOR

DESCRIPTION

1. Technical Field

The present invention relates to an inclination angle detector which electrically detects an angle of inclination of an object of measurement with respect to the horizontal direction or the direction of gravitation.

2. Background Art

There has hitherto been known one type of conventional inclination angle detector comprising a bubble tube having a transparent container formed such that the inner surface of an upper part thereof has a spherical concave surface, the transparent container having a gas and a transparent liquid sealed therein, a light-emitting unit for emitting light towards the bubble tube from the upper or lower side thereof, a light-receiving element for position detection in four-divided circular form for converting the light transmitted by the bubble tube into an electric signal, and an operating unit for calculating an angle of inclination on the basis of the electric signal so that the light from the light-emitting unit which has been transmitted by the bubble tube is received by the light-receiving element in such a manner that, as shown in FIG. 11 or 12. A change in the light quantity distribution which is caused by changing a relative position of the bubble shadow b on the light-receiving element a in accordance with the angle of inclination is detected in the form of an electrical change by the light-receiving element a and the detected change is subjected to a calculation in the operation unit, thereby photoelectrically measuring an angle of inclination.

The above-described conventional inclination angle detector has, however, a disadvantage in that the results of measurement unavoidably include large errors due to fluctuations in a bubble diameter, the intensity of the light emitted from the light-emitting unit, the photoelectric conversion sensitivity of the light-receiving element, and the like caused by temperature changes, and the like.

Further, since the bubble shadow is circular in shape, there were disadvantages in that, when an angle of inclination increases, a) a sensitivity lowers and, consequently, b) a measuring range is restricted to a narrow one and c) a correction and the like are needed in order to obtain a correct angle of inclination.

The reason why the sensitivity lowers as an angle of inclination increases will be described below. The output of the light-receiving element is proportional to the quantity of light incident on the element, while the quantity of the incident light is proportional to the irradiated area. Therefore, in order to detect an inclination in the direction of X, for example, an area difference M between the two irradiated portions of the light-receiving element divided by the Y-axis may be obtained. The area difference M is given by:

$$M = 2R\theta_X \sqrt{r^2 - (R\theta_X)^2} + 2r^2 \sin^{-1} \frac{R\theta_X}{r}$$

where
R = the radius of curvature of the bubble tube.
$\theta_X$ = an angle of inclination in the direction of X.
r = the radius of the bubble shadow.

The inclination detecting sensitivity G is proportional to the quantity obtained by differentiating the area difference M with respect to the inclination $\theta_X$ as follows:

$$G = \frac{dM}{d\theta_X} = 4R\sqrt{r^2 - (R\theta_X)^2}$$

The inclination detecting sensitivity G may be graphically shown as in FIG. 13.

In other words, when $\theta_X = 0$, $G = 4Rr$, i.e., a maximum value, and as the inclination increases, G decreases, and when $$\theta_X = \frac{r}{R}, G = 0.$$

The fact that the sensitivity changes means that the measured value includes an error unless a sensitivity correction is made. Therefore, in such a condition that G=0, there is no change in the output even if an inclination is given, so that it is practically impossible to carry out measurement.

The above-described fact also applies to the inclination in the direction of Y.

Accordingly, it is an object of the present invention to provide an inclination angle detector which is capable of maintaining a high detection accuracy even under the conditions that there are changes in the bubble diameter, the intensity of the light emitted from the light-emitting unit and the photoelectric conversion sensitivity of the light-receiving unit due to temperature changes.

It is another object of the present invention to provide an inclination angle detector which is designed so that there will be no change in the sensitivity even when an angle of inclination increases, thereby eliminating the restriction of the measuring range to a narrow one and also eliminating the need for a correction and the like in obtaining a correct angle of inclination.

DISCLOSURE OF INVENTION

The present invention provides an inclination angle detector comprising a bubble tube having a transparent container formed such that the inner surface of an upper part thereof has a spherical concave surface, the transparent container having a gas and a transparent liquid sealed therein, a light-emitting unit for emitting light towards the bubble tube from the upper or lower side thereof, a light-receiving element for converting the light transmitted by the bubble tube into an electric signal, and an operating unit for calculating an angle of inclination on the basis of the electric signal, wherein the light-receiving element comprises a light-receiving unit for position detection within a movable range of a bubble shadow and a light-receiving unit for reference outside the movable range, the two light-receiving units being disposed in close proximity to each other.

By virtue of this arrangement, it is possible to maintain a high detection accuracy even under the conditions that there are changes in the bubble diameter, the intensity of the light emitted from the light-emitting unit and the photoelectric conversion sensitivity of the light-receiving units due to temperature changes and the like.

The present invention further provides an inclination angle detector comprising a bubble tube having a transparent container formed such that the inner surface of an upper part thereof has a spherical concave surface, the transparent container having a gas and a transparent liquid sealed therein, a light-emitting unit for emitting light towards the bubble tube from the upper or lower side thereof, a light-receiving element for converting the light transmitted by the bubble tube into an electric signal, and an operating unit for calculating an angle of inclination on the basis of the electric signal, wherein the light-receiving element comprises a light-receiving unit for position detection within a movable range of a bubble shadow and a light-receiving unit for reference outside the movable range, the light-receiving unit for position detection comprising a pair of rectangular light-receiving pieces disposed such that their respective longitudinal center lines extending along the direction of inclination detection coincide with each other, the widths of the rectangular light-receiving pieces being equal to each other and being smaller than the diameter of the bubble shadow.

According to this arrangement, since the detection intensity can be maintained high and, at the same time, the sensitivity does not change at a large inclination angle even under the conditions that there are changes in the bubble diameter, the light emitting intensity of the light-emitting unit and the photoelectric conversion sensitivity due to temperature changes and the like, there is no restriction of the measuring range to a narrow one and there is no need of correction and the like in order to obtain a correct angle of inclination.

BEST MODE FOR CARRYING OUT THE INVENTION

Embodiments of the present invention will be described below with reference to the drawings.

Figure 1:
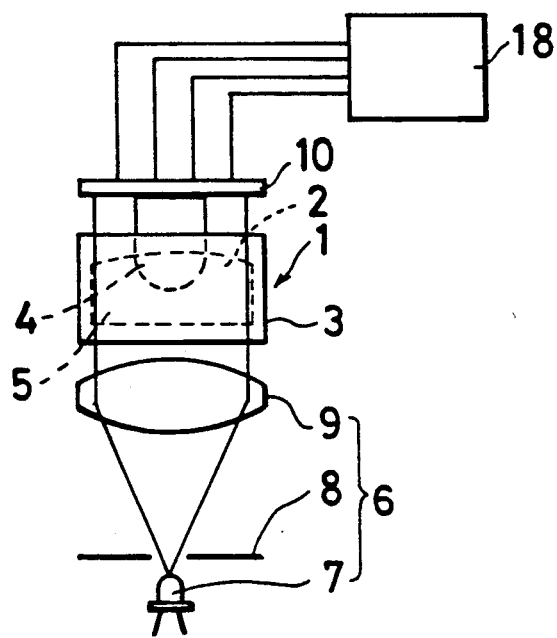
FIG. 1 is a schematic view showing one embodiment of the present invention.
Figure 2:
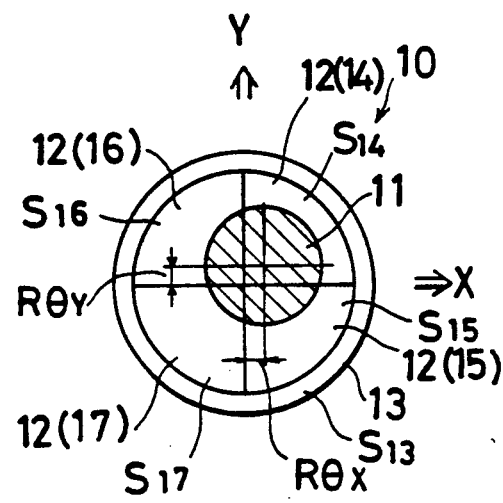
FIG. 2 shows the positional relationship between the light-receiving element and the bubble shadow in the embodiment.

In FIGS. 1 and 2, the reference numeral 1 denotes a bubble tube which is constituted by a transparent container 3 formed such that the inner surface of an upper part thereof has a spherical concave surface 2, the container 3 having a transparent liquid sealed therein with a bubble 4.

A light-emitting unit 6 is disposed under the bubble tube 1, the light-emitting unit 6 comprising a light source 7 such as a light-emitting diode and the like, and a lens 9 which irradiates the lower part of the bubble tube 1 with parallel rays of light emitted from the light source 7 through a slit plate 8.

A light-receiving element 10 such as a photosensitive detector (PSD) and the like is disposed above the bubble tube 1. The light-receiving element 10 is for converting the light transmitted by the bubble tube 1 into an electric signal to detect a two-dimensional inclination angle, i.e., an angle of inclination in the directions of X and Y, and comprises a light-receiving unit 12 for position detection which is provided within a movable range of the bubble shadow 11 and a light-receiving unit 13 for reference which is provided outside the movable range of the bubble shadow 11 in close proximity to the light-receiving unit 12 for position detection.

The light-receiving unit 12 for position detection is formed by dividing a disk-shaped light-receiving unit into four light-receiving pieces 14, 15, 16 and 17.

The light-receiving unit 13 for reference is disposed so as to surround the light-receiving unit 12 for position detection.

The reference numeral 18 denotes an operating unit which is input by electrical signals which are output from the two light-receiving units 12 and 13, thereby calculating an angle of inclination.

Thus, that light from the light source 7 which has been transmitted by the bubble tube 1 is irradiated so as to form a bubble shadow 11 on the four light-receiving pieces 14, 15, 16 and 17 which constitute in combination the light-receiving unit 12 for position detection, and the light is also irradiated simultaneously on the light-receiving unit 13 for reference. Those electrical outputs of the two light-receiving units 12 and 13 which are proportional to the area of irradiation, the intensity of irradiation, and the like are input to the operating unit 18.

In the operating unit 18, the following calculation is carried out to obtain angles of inclination in the direction of X and in the direction of Y.

It is assumed that the total area of the light-receiving pieces 14, 15, 16 and 17 which constitute in combination the light-receiving unit 12 for position detection is S, those areas of the portions thereof which are irradiated by light are $S_{14}$, $S_{15}$, $S_{16}$ and $S_{17}$, the area of the light-receiving unit 13 for reference is $S_{13}$, the components of the inclination angle in the direction of X and in the direction of Y are $\theta_X$ and $\theta_Y$ ($\theta_X$, $\theta_Y \ll 1$), respectively, the radius of curvature of the inner surface of the upper part of the bubble tube 1 is R, a coefficient that is determined by taking into consideration the intensity of the light emitted from the light-emitting unit 6, the photoelectric conversion efficiencies of the light-receiving units 12 and 13, and the like is K, and the diameter of the bubble 4 is d.

The following values A, B and C are first obtained:

$$\begin{aligned} A &= \text{(output } V_{14} \text{ of the light-receiving piece 14 +} \\ &\quad \text{output } V_{15} \text{ of the light-receiving piece 15)} - \\ &\quad \text{(output } V_{16} \text{ of the light-receiving piece 16 +} \\ &\quad \text{output } V_{17} \text{ of the light-receiving piece 17)} \\ &= K\{(S_{14} + S_{15}) - (S_{16} + S_{17})\} \\ &= -2RKd\theta_X \end{aligned}$$

-continued

B = (output $V_{14}$ of the light-receiving piece 14 + output $V_{15}$ of the light-receiving piece 15) +

(output $V_{16}$ of the light-receiving piece 16 + output $V_{17}$ of the light-receiving piece 17)

= $K\{(S_{14} + S_{15}) + (S_{16} + S_{17})\}$

= $K\left(S - \pi\dfrac{d^2}{4}\right)$

C = output $V_{13}$ of the light-receiving unit 13 for reference

= $KS_{13}$

With these values A, B and C, an inclination angle $\theta_X$ in the direction of X can be calculated by the following equation:

$$\dfrac{A}{C} \cdot \dfrac{1}{\sqrt{S - S_{13} \cdot B/C}} = \dfrac{-4R\theta_X}{\sqrt{\pi S_{13}}}$$

wherein the left side of the equation is a value calculated based on the output of the light-receiving piece and the right side of the equation is an inclination angle which is not dependent on the temperature.

$$\theta_X = -\dfrac{\sqrt{\pi} AS_{13}}{4RC} \cdot \dfrac{1}{\sqrt{S - S_{13} \cdot B/C}} \quad (1)$$

Namely, if the values A, B and C are obtained from the outputs of the light-receiving pieces 14, 15, 16 and 17 and the output of the light-receiving unit 13 and $\theta_X$ is calculated by the equation (1), the bubble diameter d and the photoelectric coefficient K of the light-emitting unit 6 and the light-receiving units 12 and 13, which vary with the temperature, are cancelled. It is, therefore, possible to obtain a correct inclination angle in the direction of X which is independent of the temperature, the intensity of the light emitted from the light-emitting unit 6 and the photoelectric conversion sensitivity of the light-receiving units 12 and 13.

Next, an explanation is made for the Y direction. The value A' in the direction of Y is obtained.

A' = (output $V_{14}$ of the light-receiving piece 14 + output $V_{16}$ of the light-receiving piece 16) −

(output $V_{15}$ of the light-receiving piece 15 + output $V_{17}$ of the light-receiving piece 17)

= $K\{(S_{14} + S_{16}) - (S_{15} + S_{17})\}$

= $-2RKd\theta_Y$

With the value A' and the above-described values B and C, an inclination angle $\theta_Y$ in the direction of Y can be calculated by an equation obtained by replacing A in the above-described equation (1) with A'.

It should be noted that the light-receiving unit 12 for position detection and the light-receiving unit 13 for reference are not necessarily limited to those in the above-descried embodiment and that those shown in FIGS. 3 through 7 may be employed.

Figure 3:
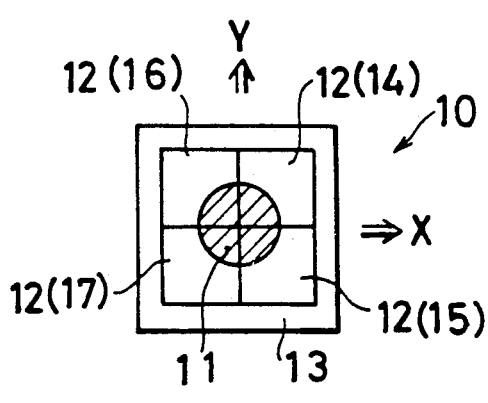
FIGS. 3 through 7 respectively show the positional relationship between the light-receiving element and the bubble shadow in other embodiments of the present invention.
Figure 4:
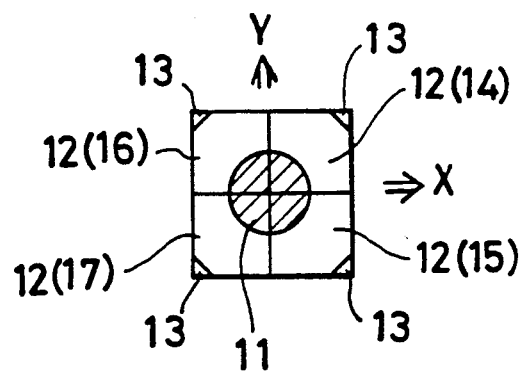
Figure 5:
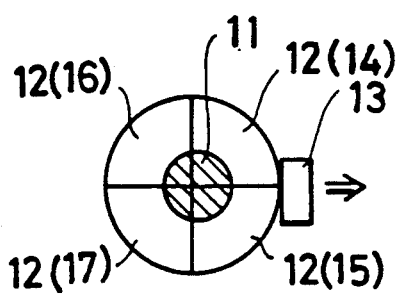
Figure 6:
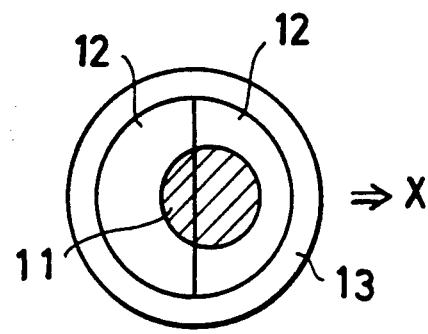
Figure 7:
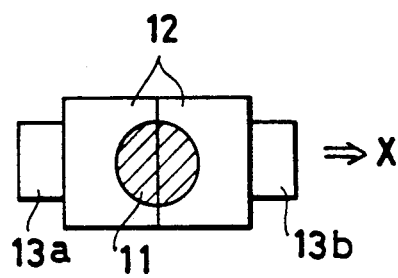

The light-receiving element 10 shown in FIG. 3 is formed in the shape of a square plate in contrast to that shown in FIG. 2 which is formed in a disk shape. FIG. 4 shows an arrangement in which the four corner portions of a light-receiving unit 12 for position detection which is formed in the form of a square plate constitute in combination a light-receiving unit 13 for reference. FIG. 5 shows an arrangement in which a light-receiving unit 13 for reference is disposed on one side of a disk-shaped light-receiving unit 12 for position detection. The light-receiving element shown in FIG. 6 comprises a disk-shaped light-receiving unit 12 for one-dimensional position detection which is divided into two portions and a light-receiving unit 13 for reference which is disposed so as to surround the light-receiving unit 12 for position detection. The light-receiving unit shown in FIG. 7 comprises a square plate-shaped light-receiving unit 12 for one-dimensional position detection which is divided into two portions and a light-receiving unit 13 for reference which is constituted by a pair of light-receiving pieces 13a and 13b disposed respectively on both sides of the light-receiving unit 12 for position detection.

Figure 8:
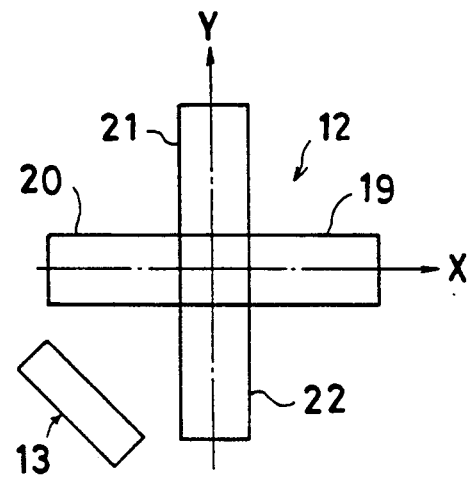
FIG. 8 shows the two-dimentional arrangement of the light-receiving element in a further embodiment of the present invention.

FIG. 8 shows the arrangement of the light-receiving element 10 in a further embodiment of the present invention.

Figure 9:
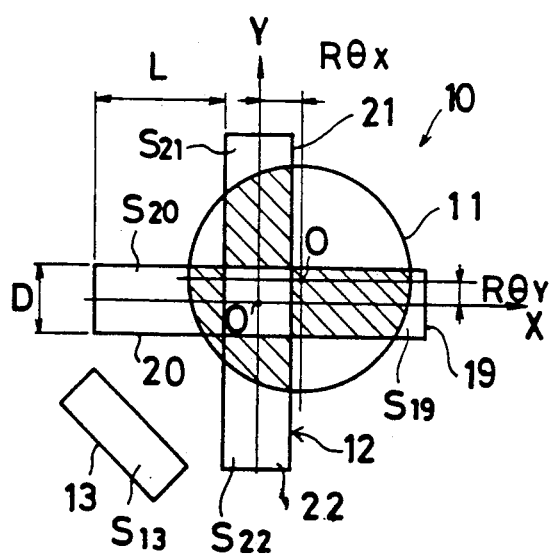
FIG. 9 shows the positional relationship between the light-receiving element and the bubble shadow in the embodiment shown in FIG. 8.

This light-receiving element 10 also converts, as shown in FIG. 1, the light transmitted by the bubble tube 1 into an electric signal to detect a two-dimensional inclination angle, i.e., an angle of inclination in the direction of X and in the direction of Y and it comprises a light-receiving unit 12 for position detection which is provided within a movable range of the bubble shadow 11 and a light-receiving unit 13 for reference which is provided outside the movable range of the bubble shadow 11, as shown in FIG. 9.

The light-receiving unit 12 for position detection is constituted by disposing a pair of rectangular light-receiving pieces 19 and 20 such that their respective longitudinal center lines extending along the direction of X coincide with each other and, at the same time, by disposing a pair of rectangular light-receiving pieces 21 and 22 such that their respective longitudinal center lines extending along the direction of Y coincide with each other.

The rectangular light-receiving pieces 19, 20, 21 and 22 are made to have the same dimensions, and the width thereof is made smaller than the diameter of the bubble shadow 11.

Both the light-receiving unit 12 for position detection and the light-receiving unit 13 for reference are connected to the operating unit 18 which calculates an angle of inclination, as shown in FIG. 1.

Thus, that light from the light source 7 which has been transmitted by the bubble tube 1 is irradiated so as to form a bubble shadow 11 on the four light-receiving pieces 19, 20, 21 and 22 which constitute in combination the light-receiving unit 12 for position detection, and the light is simultaneously irradiated to the light-receiving unit 13 for reference. Those electrical outputs from the two light-receiving units 12 and 13 which are proportional to the area of irradiation, the intensity of irradiation, and the like are input to the operating unit 18. The output of the light-receiving unit 12 for position detection is used to obtain, respectively, a difference between the two outputs of the direction of X, that is, the outputs of the rectangular light-receiving pieces 19 and 20 and a difference between the two outputs of the direction of Y, that is, the outputs of the rectangular light-receiving pieces 21 and 22. Each of the differences obtained is divided by the value of the output of the light-receiving unit 13 for reference. The results of the division are values which are proportional to only the position of the bubble shadow 11, that is, the values proportional to the inclination, independent of error factors such as fluctuations in the diameter of the bubble shadow 11, the intensity of irradiation, and the like. Therefore, if a constant of proportion is obtained in advance, it is possible to obtain a correct angle of inclination by carrying out the reverse operation on the basis of the results of division.

It should be noted that the detection of an inclination in the direction of X can be considered as follows. Namely, when a bubble shadow 11 such as that shown in FIG. 9 is formed on the light-receiving element 10, the outputs of the rectangular light-receiving pieces 19, 20, 21 and 22 which constitute in combination the light-receiving unit 12 for position detection are output in proportion to the areas $S_{19}$, $S_{20}$, $S_{21}$ and $S_{22}$, respectively, which are irradiated by that light from the light source 7 which has been transmitted by the bubble tube 1. The irradiated areas $S_{19}$ and $S_{20}$ are obtained by the following equations:

$$S_{19} = DL - \int_{R\theta_Y - D/2}^{R\theta_Y + D/2} \sqrt{r^2 - y^2}\, dy + D(R\theta_X + D/2)$$

$$S_{20} = DL - \int_{R\theta_Y - D/2}^{R\theta_Y + D/2} \sqrt{r^2 - y^2}\, dy - D(R\theta_X - D/2)$$

Here, it is assumed that the width and the length of the rectangular light-receiving pieces 19 and 20 are D and L, respectively, the radius of the bubble shadow 11 is r, the radius of curvature of the inner surface of an upper part of the bubble tube 1 is R, and the inclination components in the direction of X and in the direction of Y are $\theta_X$ and $\theta_Y$, respectively. It should be noted that a state wherein the centers of the rectangular light-receiving pieces 19, 20, 21 and 22 and the center of the bubble shadow 11 are coincident with each other, that is, the center O' of the bubble 11 and the origin O of the X- and Y-axes coincide with each other, is defined as being horizontal.

If the coefficient that is determined by taking into consideration the intensity of the light emitted from the light-emitting unit 6, the photoelectric conversion efficiencies of the light-receiving units 12 and 13 per unit area, and the like is assumed to be K, the outputs $V_{19}$, $V_{20}$ and $V_{13}$ of the light-receiving piece 19, the light-receiving piece 20 and the light-receiving unit 13 are $K_{19}$, $K_{20}$ and $K_{13}$, respectively, and the following value $T_X$ is obtained by:

$$T_X = \frac{(V_{19} - V_{20})}{(V_{13})} = \frac{2DR}{S_{13}} \cdot \theta_X \quad (2)$$

Thus, the value $T_X$ is proportional to the inclination angle $\theta_X$, and from this equation (2) the following equation is obtained:

$$\theta_X = \frac{S_{13}T_X}{2DR} \quad (3)$$

Thus, the inclination angle $\theta_X$ in the direction of X is obtained.

Namely, if the value $T_X$ is obtained from the outputs $V_{19}$, $V_{20}$ and $V_{13}$ of the light-receiving piece 19, the light-receiving piece 20 and the light-receiving unit 13, the value $T_X$ does not include the coefficient K determined by taking into consideration the radius r of the bubble shadow 11, the photoelectric conversion efficiency, and the like which are affected by the temperature, as shown by the equation (2). Therefore, if $\theta_X$ is calculated by the equation (3), it is possible to obtain a correct inclination angle in the direction of X which is not dependent on the temperature, the intensity of the light emitted from the light-emitting unit 6 and the photoelectric conversion sensitivity.

It will be easily understood that the inclination angle $\theta_Y$ in the direction of Y can be obtained in the same way.

In other words, the outputs $V_{21}$ and $V_{22}$ of the light-receiving pieces 21 and 22 are $V_{21} = KS_{21}$ and $V_{22} = KS_{22}$, respectively, and the value $T_Y$ is obtained as follows:

$$T_Y = \frac{(V_{21} - V_{22})}{V_{13}} = \frac{2DR}{S_{13}} \cdot \theta_Y \quad (4)$$

Thus, the value $T_Y$ is proportional to the inclination angle $\theta_Y$, and from the equation (4) the following equation is obtained:

$$\theta_Y = \frac{S_{13}T_Y}{2DR} \quad (5)$$

Next, the sensitivity with respect to the inclination angle is obtained. From the equation (2), the sensitivity may be expressed as follows:

$$G = \frac{dT_X}{d\theta_X} = \frac{2DR}{S_{13}} = \text{constant}$$

Figure 13:
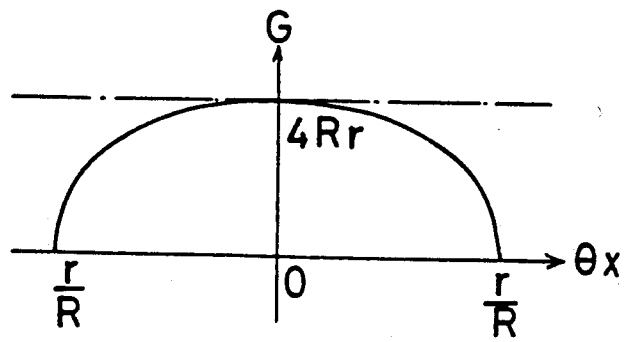
FIG. 13 is a characteristic chart showing the sensitivity of the prior art and that of the present invention.

In other words, the sensitivity is constant over the whole measuring range, as shown by a dashed line in FIG. 13. Accordingly, it is unnecessary to make a correction in order to obtain a correct angle of inclination, and the measuring range is consequently enlarged.

The above-described fact also applies to the inclination in the direction of Y.

It should be noted that the order of subtraction and division to be carried out in obtaining $T_X$ and $T_Y$ may be arbitrary, i.e., whichever may be done first, and the calculation may be done in either an analog or digital manner.

Further, since K can be made a constant by controlling such that the value $V_{13}$ becomes constant, it is also possible to eliminate the need for division.

Further, it will be easily understood that the light-receiving unit 13 for reference may have any configuration and may be provided in any number and disposed at any position as long as the intensity of irradiation and the photoelectric conversion sensitivity can be detected.

Figure 10:
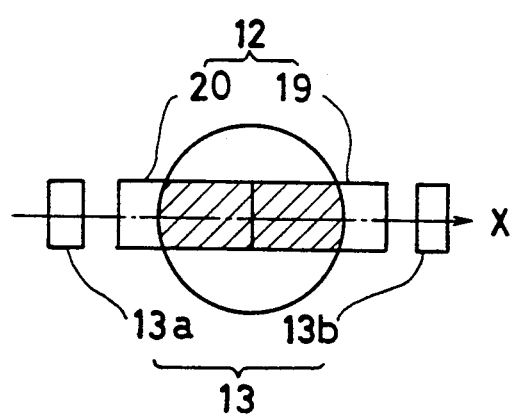
FIG. 10 shows the positional relationship between the light-receiving element and the bubble shadow in a still further embodiment of the present invention.
Figure 11:
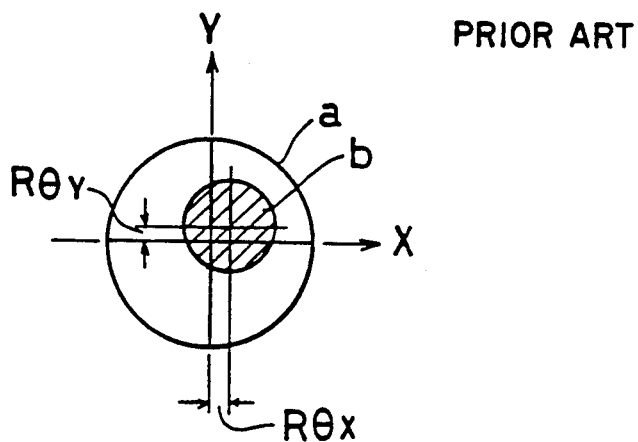
FIGS. 11 and 12 each show the positional relationship between the light-receiving element and the bubble shadow in a prior art.
Figure 12:
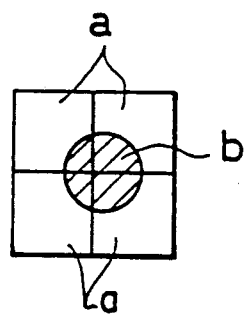

FIG. 10 shows the arrangement of the light-receiving element 10 in a still further embodiment of the present invention.

In this embodiment, the light-receiving unit 12 for position detection is constituted only by a pair of light-receiving pieces 19 and 20 in the direction of X which are employed in the above-described embodiment, and a pair of light-receiving pieces 13a and 13b which constitute in combination a light-receiving unit 13 for reference are disposed on both sides, respectively, of the light-receiving unit 12. In this embodiment also, it is possible to obtain an accurate inclination angle in the direction of X in exactly the same way as in the above-described embodiment.

It should be noted that, if the configurations of the light-receiving unit 12 for position detection and the light-receiving unit 13 for reference are particularly designed as in the above-described two embodiments, the equation for calculating the inclination angle is simplified, the lineality is improved, and the measuring range is enlarged.

INDUSTRIAL APPLICABILITY

As has been described above, the inclination angle detector according to the present invention is capable of detecting an angle of inclination of an object of measurement with respect to the horizontal direction or the direction of gravitation and it is therefore useful for various kinds of application such as surveying, and the like.

I claim:

1. An inclination angle detector comprising:
   a bubble tube having a transparent container formed such that an inner surface of an upper part thereof has a spherical concave surface, said transparent container having a gas and a transparent liquid sealed therein;
   a light-emitting unit for emitting light towards said bubble tube from one of an upper and lower side thereof;
   a light-receiving element for converting the light transmitted by said bubble tube into an electric signal; and
   an operating unit for calculating an angle of inclination based on said electric signal;
   wherein said light-receiving element comprises a first light-receiving unit for position detection within a movable range of a bubble shadow and a second light-receiving unit for reference outside said movable range.

2. An inclination angle detector according to claim 1, wherein said first light-receiving unit for position detection comprises a pair of rectangular light-receiving pieces disposed such that respective longitudinal center lines thereof, extending along a direction of inclination detection, coincide with each other, widths of said rectangular light-receiving pieces being equal to each other and smaller than a diameter of a bubble shadow.

* * * * *

UNITED STATES PATENT AND TRADEMARK OFFICE
CERTIFICATE OF CORRECTION

PATENT NO. : 5,101,570
DATED : April 7, 1992
INVENTOR(S) : Kikuo SHIMURA

It is certified that error appears in the above-identified patent and that said Letters Patent is hereby corrected as shown below:

Column 5, line 10, delete "$= K\{S = \pi \frac{d^2}{4}\}$" and insert therefor -- $= K\{S - \pi \frac{d^2}{4}\}$ --.

Signed and Sealed this

Twentieth Day of July, 1993

Attest:

MICHAEL K. KIRK

Attesting Officer     Acting Commissioner of Patents and Trademarks